US008583127B2

(12) United States Patent
Francalanci et al.

(10) Patent No.: US 8,583,127 B2
(45) Date of Patent: Nov. 12, 2013

(54) PROCESS FOR PLANNING A COMMUNICATIONS NETWORK, RELATED PLANNING SYSTEM, AND RELATED COMMUNICATIONS NETWORKS AND COMPUTER PROGRAM PRODUCT

(75) Inventors: Indro Francalanci, Turin (IT); Massimiliano Panico, Turin (IT)

(73) Assignee: Telecom Italia S.p.A., Milan (IT)

( * ) Notice: Subject to any disclaimer, the term of this patent is extended or adjusted under 35 U.S.C. 154(b) by 839 days.

(21) Appl. No.: 11/667,309

(22) PCT Filed: Nov. 9, 2004

(86) PCT No.: PCT/IB2004/003660
§ 371 (c)(1),
(2), (4) Date: Oct. 11, 2007

(87) PCT Pub. No.: WO2006/051343
PCT Pub. Date: May 18, 2006

(65) Prior Publication Data
US 2008/0125130 A1   May 29, 2008

(51) Int. Cl.
*H04W 40/00* (2009.01)
*H04W 72/00* (2009.01)

(52) U.S. Cl.
USPC .......................................... 455/446; 455/572

(58) Field of Classification Search
USPC .......... 455/446, 453, 552, 571, 572; 370/311, 370/318
See application file for complete search history.

(56) References Cited

U.S. PATENT DOCUMENTS 6,021,329 A * 2/2000 Kornestedt et al. ........... 455/446
6,128,496 A * 10/2000 Scheinert ...................... 455/446

(Continued)

FOREIGN PATENT DOCUMENTS

EP   1 328 131 A1   7/2003
EP   1 335 616 A2   8/2003

OTHER PUBLICATIONS

"RF System Scenarios"; 3$^{rd}$ Generation Partnership Project: Technical Specification Group Radio Access Networks; 3GPP TR 25.942 V3.0.0, (Release 1999), pp. 1-110 (Mar. 2001).

(Continued)

*Primary Examiner* — San Htun
*Assistant Examiner* — Scott Au
(74) *Attorney, Agent, or Firm* — Finnegan, Henderson, Farabow, Garrett & Dunner, LLP

(57) ABSTRACT

A communications network includes a set of user terminals to which communication services are provided by means of a set of service areas identified by cells with respective associated cell serving stations, each serving station having certain output transmission power and service capacity values. The cells are divided into pixels and the user terminals communicate within the cells on respective uplinks and downlinks. The services have respective service quality levels associated on the uplinks and downlinks, while the serving stations have respective power limits related to the maximum power that can be delivered by the radio station globally toward all served terminals and to the power that can be delivered for every individual connection toward an individual terminal. The network under examination is planned by determining each of the service areas as joint uplink/downlink service area composed of the set of pixels in which the respective service is guaranteed by complying with the associated quality requirements on both links (uplinks and downlinks) and verifying the compliance with the above limits on the maximum power that can be delivered by the radio station both globally toward all served terminals and by individual connection toward an individual terminal.

16 Claims, 2 Drawing Sheets

(56) References Cited

U.S. PATENT DOCUMENTS

| | | | |
|---|---|---|---|
| 6,456,652 B1 | 9/2002 | Kim et al. | |
| 6,487,414 B1 * | 11/2002 | Tanay et al. | 455/450 |
| 6,735,448 B1 * | 5/2004 | Krishnamurthy et al. | 455/522 |
| 6,810,246 B1 * | 10/2004 | Kalofonos et al. | 455/423 |
| 6,892,073 B2 * | 5/2005 | Fattouch | 455/446 |
| 6,985,735 B2 * | 1/2006 | Gustafsson | 455/446 |
| 7,103,361 B2 * | 9/2006 | Gustafsson | 455/446 |
| 2001/0036824 A1 * | 11/2001 | Hamabe | 455/422 |

OTHER PUBLICATIONS

Menolascino et al.; "STORMS; Software Tools for the Optimisation of Resources in Mobile Systems"; Project No. AC016; pp. i-vii, and 1-57, (Apr. 1999).

* cited by examiner

PROCESS FOR PLANNING A COMMUNICATIONS NETWORK, RELATED PLANNING SYSTEM, AND RELATED COMMUNICATIONS NETWORKS AND COMPUTER PROGRAM PRODUCT

CROSS REFERENCE TO RELATED APPLICATION

This application is a national phase application based on PCT/IB2004/003660, filed Nov. 9, 2004, the content of which is incorporated herein by reference.

FIELD OF THE INVENTION

The present invention refers to techniques for making the communications networks, such as the networks comprising a plurality of cells arranged on a certain territory or area.

The invention has been developed by paying specific attention to its possible application to radio mobile networks. The invention can be applied, with a particular advantage, to third-generation mobile networks, for example according to the UMTS (Universal Mobile Telecommunications System) standard, that uses a radio interface based on the CDMA (Code Division Multiple Access) technique.

In any case, reference to this particular field of application must not be intended in a limiting sense for the scope of the invention.

DESCRIPTION OF THE PRIOR ART

Mobile telecommunications networks are usually arranged according to a cellular structure and they comprise a plurality of cells, each one defined as the set of territory points (pixel) served by the radio-electric signal radiated from an antenna. Among the known cellular networks, networks using the CDMA technique have the peculiarity that the same frequency band (or "channel") can be re-used in the various cells. Therefore, the passage of a mobile terminal from one cell to another contiguous cell (called handover) can be managed by using the same frequency, according to a mechanism called soft-handover. This mechanism provides that, in particular areas, called soft-handover or macro-diversity areas, the mobile terminal is able to decode the signals and therefore to exchange information with many antennas and consequently with many Base Radio Stations (BRS).

Obviously, the location of the macro-diversity areas (and their measurement) are highly important factors for the correct operation and measurement of cell apparatus: a mobile terminal in macro-diversity, in fact, uses resources of all base radio stations with which it is simultaneously connected, therefore more resources than those that are actually necessary for allowing the communication.

A further peculiarity of UMTS networks is that such networks are adapted to provide a plurality of different services, such as, for example, telephony, fax, video-telephony, Internet access, streaming and so on. Each one of such services generally has characteristics in terms of speed (number of bit per second) and traffic (amount, symmetrical or asymmetrical) that are specific for the service under examination.

The cell measurement must therefore jointly take into account the characteristics of each service and the possible associations of services on a single radio carrier as provided according to the CDMA access technique.

Like every cellular radio-mobile system, also the UMTS network provides for common broadcast control channels in the whole cell area. Such channels contain system information, that are necessary for radio apparatus (receivers).

Due to its peculiarities, the UMTS networks planning is a complex activity, requiring approaches that are substantially different from those used so far for known networks of the cellular type, such as GSM (Global System for Mobile Communication) or IS95 (Interim Standard).

In general, the planning action aims to identify, as results or outputs, in view of the actual network development, the positioning of radio stations within the area under examination and also allows determining the set of radio-electric cell parameters (for example antenna tilt, maximum gain direction azimuth, radio power, etc.) and the allocation of spectrum resources assigned to the operator (for example radio carriers). Such outputs are determined by the planning process in compliance with planning objectives, such as, for example:

minimum value of territory covered by the service, within an area under planning;

maximisation of the traffic to be managed among the one provided within the area under planning.

For such purpose, various planning techniques for UMTS networks are known; according to the followed approach, these techniques can be grouped into two different families: "statistical" methods and "deterministic" methods.

Statistical methods are mainly based on an approach of the Montecarlo type (see, about it, 3GPP TR 25.942 v3.0.0 2001-06—"RF System Scenarios—Release 1999" specification).

The term "Montecarlo simulation" is usually employed for pointing out a static simulation composed of a set of statistically independent snapshots. After having fixed the scenario being studied, each snapshot consists in realising a stochastic process generated starting from different distributions of users in the area being examined. At the end of every snapshot, network performance indicators are provided as results, and the procedure ends with the statistical analysis of various performance indicators provided by every snapshot.

The number of snapshots must obviously be enough to guarantee statistical stability for the planning results. It is a rather specific methodology, particularly adapted for examining performances of a not geographically wide UMTS network, but owing to its intrinsic "slowness" due to the statistical convergence of results, it cannot be extended to the analysis of UMTS networks related to geographical areas that can be compared with those of a nation such as, for example, Italy.

Though keeping the characteristic of a static analysis, the deterministic methods systematically take into account all pixels of the territory on which the network will be planned. Differently from statistical methods, of the Montecarlo type, these methods use, as input data, a single users distribution and are performed in a single simulation without needing statistical aggregations of results. These methods are clearly more suitable for planning UMTS mobile networks related to very large geographical areas, even if the planning result generally has smaller levels of adherence to the evolving reality.

Among the steps included in a method for planning a communications network of the type described here, being of the statistical or of the deterministic type, the so-called "capacity check" on the downlink, namely from the cell to the terminal, is particularly important. The check in question implies a computational control that the measurement of radio station power amplifiers is enough to manage the expected traffic in the area under planning.

In networks based on access techniques of the CDMA or W-CDMA type, such as UMTS, and in network scenarios characterised by low or medium traffic values, the uplink is the one usually having the biggest problems when planning (limiting uplink); in fact the corresponding relatively low traffic values do not imply particular capacity problems in downlink.

In network scenarios characterised by high and/or unbalanced traffic values between the two links (uplink and downlink), the downlink implies bigger problems (limiting downlink). In fact, the downlink power, to be shared among all terminals to be served, consists in the maximum power that can be supplied by the generic radio station; this implies, upon increasing the traffic, a decrease of the area in which it is possible to guarantee the service.

The capacity check synthetically is a way to verify whether the radio station has enough power to support the provided traffic. The maximum power that can be supplied by each radio station, in fact, is a shared resource among all terminals connected to the station itself.

Planning methods are known that perform the "capacity check" on the downlink, such as, for example, the method disclosed in EP-A-1 335 616. According to such method, the capacity check on the downlink is performed downstream of determining the service area on the uplink (set of pixels of the area under planning in which a generic terminal that can be found on the pixel is able to establish a connection with a radio station) assuming the service area in uplink as input. The capacity check on the downlink is meant as validation, on the downlink, of the obtained result, in terms of service area, of the planning performed on the uplink.

This validation, namely the capacity check, is performed by computing, for every radio station and for every communication managed by the radio station on the uplink, the power needed to guarantee such communication ensuring a predetermined quality level (target signal-to-noise ratio), taking into account the interference generated by nearby radio stations that, in a CDMA or W-CDMA access system, operate, as known for a person skilled in the art, on the same frequency channel.

The generic radio station complies with the capacity check on the downlink (positive response) if the total power needed to manage all the traffic channels (served terminals) together with the power associated with the common control channels (for example the Common Pilot Channel (CPICH), Supplemental Channel (SCH) etc.), is less than or at least equal to the maximum power that can be delivered by the radio station (generally a fraction of the rated power of the radio station amplifier), otherwise the capacity check provides for a negative response.

If any radio station, within the area under planning, does not comply with the capacity check, the process provides the return to the hypotheses made when starting the planning process, or, in general, within any one of its steps, and the repetition of one or more process steps (recycle). This is done till one obtains the compliance with the capacity check for all radio stations that can be found within the area under planning.

This known arrangement essentially implies three major limits.

Firstly, the capacity check computation downstream of determining the service area on the uplink brings about acceptable results only when there are traffic scenarios with limiting uplink while, in traffic scenarios with limiting downlink, such approach brings about incorrect results. Under situations in which the downlink is limiting, in fact, a correct planning approach would suggest to first compute the service area on the downlink.

Secondly, the possible negative response of the capacity check invalidates the results obtained in the previous planning steps (for example the service area on the uplink), making it necessary to execute again such steps till a positive response is obtained by the capacity check on the downlink.

Moreover, as regards a correct determination of planning process output parameters, it is important to take into account some parameters associated with the radio station, such as, for example, the minimum power (Pmin) that can be delivered by the radio station, for a single connection on the downlink, the maximum power (Pmax) that can be delivered by the radio station, always for every single connection on the downlink and the sum of powers delivered by the radio station ($P_{TOT}$), that must be such as not to exceed the maximum power that can be delivered by the radio station itself.

In particular, the maximum power value per traffic channel is used for performing a better load balancing by placing a limit to the maximum power that can be used for managing a single connection (as occurs, for example, for remote terminals from the radio station).

The prior art performs no hypotheses related to the range [Pmin,Pmax] of deliverable power per individual connection.

In such a way, the capacity check, though complying with the condition about the maximum power that can be delivered by the radio station ($P_{TOT}$), can give a wrong response, particularly a too optimistic response; this above all when, for example, there are terminals that need high powers on the downlink (for example terminals that are remote from the radio station and/or terminals with other service quality requirements). This implies that the thereby-computed planning operation output parameters can contain areas and terminals that cannot be reached by the actual service even if the capacity check provides a positive response.

A correct CDMA or W-CDMA network planning must provide as output a service area that takes into account, simultaneously within the same computation step, the service quality requirements associated with both links (uplink and downlink).

Such area will usually be composed, for a generic service supported by the network under planning, of all pixels of the area under planning that simultaneously satisfy three basic requirements:
  they belong to the service area on the uplink;
  the radio station associates a power level, included in the range [Pmin, Pmax], with every terminal that can be found on the pixel;
  the serving radio station complies with the capacity check (namely its service capacity).

OBJECT AND SUMMARY OF THE INVENTION

From the previous description about the current situation, it is clear that there is a need for having available arrangements that are able to perform, in a more satisfactory way, the planning of a communications network. This in particular as regards the three major limits which have been referred to previously when dealing with the prior art.

Object of the present invention is satisfying the above need.

According to the present invention, this object is obtained due to a process having the characteristics included in the following claims. The present invention deals also with a corresponding planning system, a network planned with the above process or system, in addition to a computer program product that can be loaded in the memory of at least one processor and comprises portions of software code for performing the above process, when the product is executed on at least one processor. As used herein, the reference to such a computer program product is meant as equivalent to the reference of media readable by a processor containing instructions for controlling a processor system in order to coordinate the performance of the process according to the invention. The reference to "at least one processor" is aimed to point out the possibility that the present invention is put in practice in a distributed and/or modular way. The claims are an integral part of the technical teaching provided herein regarding the invention.

A preferred embodiment of the invention allows planning a communications network comprising a set of user terminals (UE) to which communications services are provided by means of a set of service areas identified by cells having associated respective cell serving stations, each station having certain output transmission power and service capacity, wherein the cells are divided into pixels and wherein the user terminals (UE) communicate within said cells on respective uplinks and downlinks. The services have associated respective service quality levels on the uplinks and downlinks, while each of the serving stations has respective power limits related to the maximum power $P_{TOT}$ that can be delivered by the radio station globally towards all served terminals (UE) and to the power that can be delivered for every individual connection towards an individual terminal that must be included between Pmin and Pmax. The preferred embodiment of the herein-described invention comprises the step of determining each of the service areas of said set as joint uplink/downlink service area composed of the set of pixels wherein the respective service is guaranteed by complying with the quality requirements associated with both links (uplink and downlink) and verifying the compliance of the above limit with the maximum power that can be delivered by the radio station both globally ($P_{TOT}$) towards all served terminals (UE) and for every individual connection towards an individual terminal ([Pmin,Pmax]).

In a particularly preferred way, determining the above joint uplink/downlink service area comprises:
- a first sub-step of controlling the admission (Admission Control), in which a set of admission control pixels are determined, subjected to be served by the determined service capacity of the respective serving station, and
- a second sub-step of controlling the power (Power Control), in which it is verified whether the above admission control pixels belong to said joint uplink/downlink service area.

In the currently preferred embodiment, in the above first sub-step, there is defined, depending on the distribution of expected traffic and the domain of pixels in which the serving station signal can be decoded by a terminal (UE) when there is only thermal noise, at least one sub-area of the above domain composed of the admission control pixels in which a serving station control channel has a signal level that is greater than all control signals related to all other serving stations belonging to the area under planning.

Always in the currently preferred embodiment, in the above second sub-step, the following is verified:
- in a first step of verifying on the uplink, depending on the admission control pixels, whether the power level of the terminal (UE) necessary for communicating with the serving station is less than or equal to the maximum power level that can be delivered by the terminal (UE); and
- in a second step of verifying on the downlink, depending on said first verifying step, whether the power level of the serving station falls within the maximum power that can be delivered by the serving station ($P_{TOT}$) globally towards all served terminals (UE) and by individual connection towards an individual terminal ([Pmin, Pmax]).

The herein described arrangement exceeds the limits of the arrangements according to the prior art by introducing a definition of joint uplink/downlink service area composed of the set of pixels belonging to the area under planning in which the generic terminal being present on the pixel is able to establish and keep a radio communication on both links (uplink and downlink). The joint uplink/downlink service area will in general be different for every service or family of services provided by the network under planning.

A preferred embodiment of the herein described arrangement provides for performing a joint iterative process that relates the service area computing steps on the uplink and the capacity check on the downlink.

By operating in this way, the result of the planning process does not need any re-examination of the planning steps in reply to negative responses of the capacity check since the capacity check is a step inserted when determining the service area. This avoids having to repeat planning process steps and also contributes to the degree of reliability and correctness when determining the service area, in addition to the correspondence of the area under examination with the given definition: this in terms of simultaneous service guarantee on the two links and of correct use of radio station power resources in compliance with the maximum power limits that can be delivered by the radio station, both globally towards all served terminals, and individually by connection.

The herein described arrangement avoids computing the capacity check downstream of determining the service area on the uplink and, therefore, avoids that the planning brings about acceptable results only when there are traffic scenarios with limiting uplink. The herein described arrangement in fact brings about correct results also in traffic scenarios with limiting downlink. A possible negative response of a capacity check step during the service area planning, being inserted in the step of determining the service area with uplink, does not invalidate the results obtained in the previous steps. This allows avoiding having to perform such steps again cyclically.

Still more, the herein described arrangement allows correctly determining the planning process output parameters, and takes into account various parameters associated with the radio station, such as, for example, the minimum power (Pmin) that can be delivered by the radio station, by individual connection on the downlink and the maximum power (Pmax) that can be delivered by the radio station, always by individual connection on the downlink.

BRIEF DESCRIPTION OF THE DRAWINGS

The invention will now be described, as a non-limiting example, with reference to the figures of the attached drawings, in which.

DETAILED DESCRIPTION OF EMBODIMENTS OF THE INVENTION

The detailed description that follows refers to the possible use of the invention within a network planning process of the deterministic type.

Figure 1:
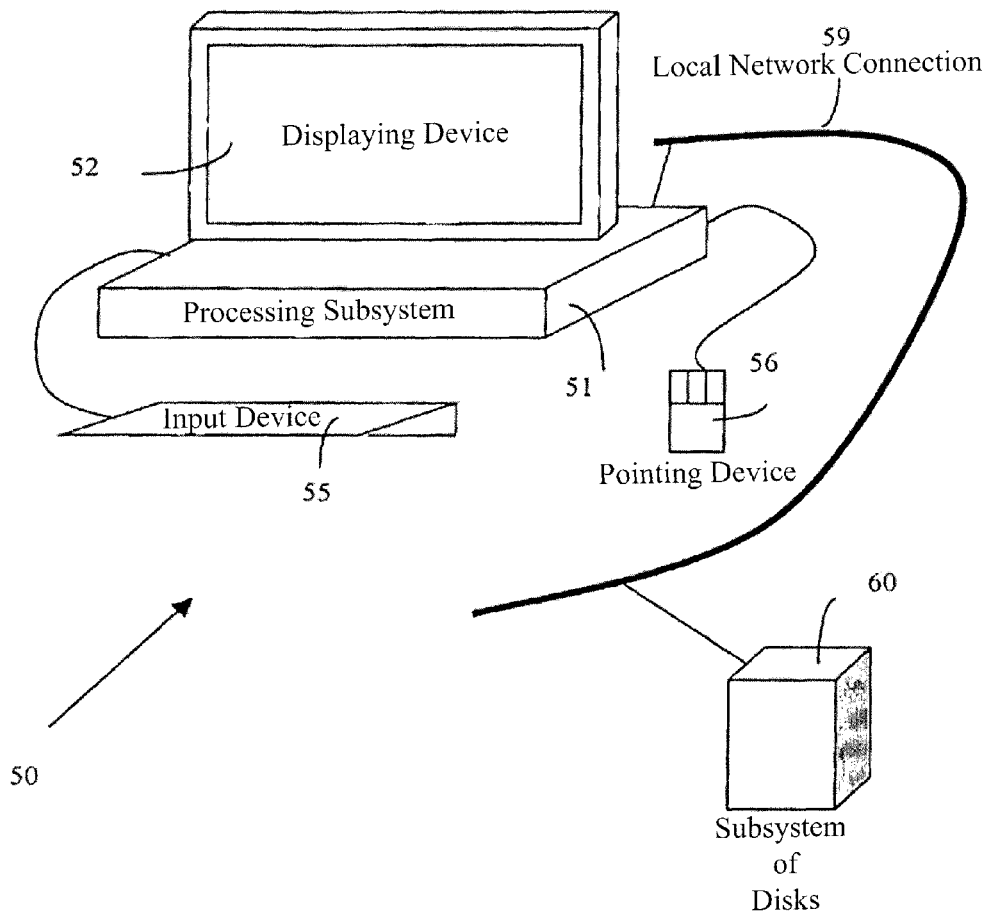
FIG. 1 schematically shows a system for planning communication networks that can be used with the invention.

With reference to FIG. 1, a system for planning a network of mobile telecommunications apparatus comprises, for example, a computerised workstation 50, of a known type, having a processing subsystem (basic module) 51, a displaying device (display) 52, an input device (keyboard) 55, a pointing device (mouse) 56 and a device for connecting to a local network (network connection) 59.

The workstation 50 is able to process groups of programs or modules and to display the results on the display 52, as will be described in detail below. This system further comprises a subsystem of disks 60, of the known type, connected by means of the network connection 59 to the workstation 50 and able to store reference data bases, as will be described in detail below, with reference to the method implementation according to the invention. Obviously, the data bases can also be stored, if their sizes are small, in the workstation 50 disk unit.

In the described configuration, the system is able to allow the planning of a network for mobile terminals depending on modules implemented for performing the herein described method and with the help of data bases stored in the subsystem of disks 60.

In a network planning process of the deterministic type, the following steps are typically provided:

a) computing the electromagnetic coverages: as known to the expert in the art, this step determines sizes and characteristics of each coverage, namely the locus of points or pixels in which the radio-electric signal is received within a certain radius (for example 80 Km) from the apparatus (antenna) that radiates;

b) computing/evaluating the traffic distribution on the territory; also like in this case known to the experts in the art, this step evaluates the offered traffic for every service per area unit (pixel);

c) computing the domains; this step uses, as input data, the coverages and therefore it uses realistic propagation models related to the area under examination; this step computes, within each coverage, the cell "domain", namely the locus of points or pixels in which the radio-electric signal can be decoded by a mobile terminal when there is only thermal noise. In the case taken into account as an example, the domain computation is specific for UMTS networks and for the downlink and is performed by taking as reference the family of services that has looser limits, namely that service or family of services that requires the lowest value of received power to be able to decode the radio-electric signal. In particular, the domain of each cell is computed by verifying for every coverage pixel whether the radio-electric signal is received with a power that exceeds the threshold determined by the less restrictive service. The fact that the embodiment of the invention taken into account here is the one of a UMTS network makes the parameters taken into account and the acronyms used in the description be the current ones in such application sector: being therefore parameters and acronyms well known to the expert in the art, a detailed description of the meaning of such parameters and such acronyms is superfluous herein;

d) computing the Best Server area of the pilot channel (CPICH). Also like in this case as known to the experts in the art, in this step every territory pixel belonging to the area under planning is univocally assigned to a radio station. The radio station under examination, called Best Server Cell of the pixel, corresponds to the radio station whose signal field level related to the CPICH (RSCP) channel is greater than all RSCP signals related to all other radio stations belonging to the area under planning (Best RSCP).

e) computing the joint uplink/downlink service area. This step of computing the service area, joint uplink/downlink one, is a particularly relevant aspect of the herein described arrangement and comprises two sub-steps; a first computation sub-step, called "Admission Control", and a second joint control sub-step, called "Power Control", on the two uplink and downlink links.

The first step (Admission Control) exploits information about the traffic distribution together with those related to domains (it must be remembered that the term cell "domain" means the locus of points or pixels in which the radio-electric signal can be decoded by a mobile terminal when there is only thermal noise) and allows the measurement, within the Best Server CPICH area related to the area under planning, of the sub-area on which computations related to the joint uplink/downlink Power Control sub-step can be performed.

The computation related to the admission control is based on the uplink, and is typically performed, in a known way, by using the equation called "Pole Capacity" (see, for example, document AC016/CSE/MRM/DR/P/091 entitled "STORMS Project Final Report", developed under the STORMS (Software Tools for the Optimisation of Resources in Mobile Systems) project promoted by the European Union. With such equation the cell project loading factor $\eta$ is determined, namely the ratio between the cell load that is provided to be accepted and the maximum load (also designated as "pole capacity"), next to which the system is under unstable conditions. The area (subset of pixels of the Best Server CPICH related to the area under planning) determined by the computation processes of this sub-step is the computation domain of the following sub-step and will be called herein below "Admission Control area".

As known, if the project loading factor is equal to the maximum possible one ($\eta=1$), the Admission Control area degenerates in the Best Server CPICH area. A possible proposal of the computation domain of the joint uplink/downlink Power Control sub-step will therefore be composed of the Best Server CPICH area related to the radio stations belonging to the area under planning. The joint uplink/downlink Power Control sub-step completes the computation of the joint uplink/downlink service area. Aim of this step is determining the subset of pixels, belonging to the area under planning, in which it is possible to guarantee the service as regards the expected (terminal) traffic (step of "computing/evaluating the traffic distribution on the territory"). This subset of pixels will be composed of all pixels satisfying the previously expressed requirements for belonging to the joint uplink/downlink service area. The computations included in this sub-step consist in two checks, the first one performed on the uplink and the second one performed on the downlink. The first check consists in computing the necessary power for every terminal, that can be found inside the area determined in the previous sub-step, in order to communicate with the radio station serving the pixel, verifying that such power is lower than or at most equal to the maximum power that can be delivered by the terminal (generally a fraction of the rated power of the amplifier being present on the terminal). If the check provides a positive result, the pixel is inserted in the set of served pixels on the uplink, while, if the check provides a negative result, the pixel is inserted in the set of pixels that are not operating (outage). The second check, performed on the set of served pixels on the uplink, consists in computing the necessary power, to the radio station serving each pixel, for managing the expected traffic in the pixel and in the following check that such power falls within the previously defined range [Pmin, Pmax] and that the total power of every radio station is lower than or at most equal to the maximum power that can be delivered by the radio station.

In other words, this sub-step consists in all computations and checks adapted to determine whether each terminal, being present inside the area under planning, is able to establish and maintain a radio communication with a radio station within the area under planning.

The computation process related to the second sub-step of the step for "Computing the joint uplink/downlink service area", is described below and involves, with reference to the embodiment to which the present description refers, the below-listed parameters:

$SNR_s^{DL}$ Target signal-to-noise ratio for the service s on the downlink;

Pmin minimum power that can be delivered in every individual connection;

Pmax maximum power that can be delivered in every individual connection;

$SNR_s^{UL}$ Target signal-to-noise ratio for the service s on the uplink;

$N_{m,n,s}$ Number of active connection for service s on pixel (m,n);

$P_{Noise}$ Thermal Noise Power;

$P_{req}(j)$ Total power transmitted by base radio station j;

$P_j^{SCH}$ Power transmitted on SCH channel by base radio station j;

$P_j^{ComCH}$ Power transmitted on common channels (excluding SCH) by station j;

$\alpha_j$ Orthogonality coefficient among the Spreading codes on the downlink for cell j;

$Loss_{UL}(m,n,j)$ Attenuation of link from pixel (m,n) to cell j on the uplink;

$Loss_{DL}(m,n,j)$ Attenuation of link from pixel (m,n) to cell j on the downlink;

$\chi_s^{DL}$ Service Activity Factor of service s on the downlink;

$\chi_s^{UL}$ Service Activity Factor of service s on the uplink;

$P_{m,n,s}^{UE}$ Power transmitted by the generic mobile terminal being present in pixel (m, n), on service s;

$P_{MAX}^{UE}$ Maximum Power that can be delivered by the terminal;

$P_{TOT}^j$ Maximum Power that can be delivered by the radio station j;

$P_{m,n,s}^j$ Power transmitted by station j on the traffic channel dedicated to the generic mobile terminal being present in pixel (m, n), on service s;

MD(m,n,Thr) Set of radio stations whose power value on CPICH (RSCP) channel in pixel (m,n) is at most equal to Thr dB (Macro-diversity window) under the RSCP value of the Best Server CPICH in pixel (m,n);

$\Phi_j$ Set of pixels (m,n) belonging to the service area of cell j;

$\Omega_j$ Set of pixels (m,n) belonging to the Admission Control area of cell j (input computation domain);

$N_{serv}^j$ Number of services managed by cell j;

RTWP(j) Total power received by station j;

$N_{cells}$ Number of radio stations being present in the area under planning.

Figure 2:
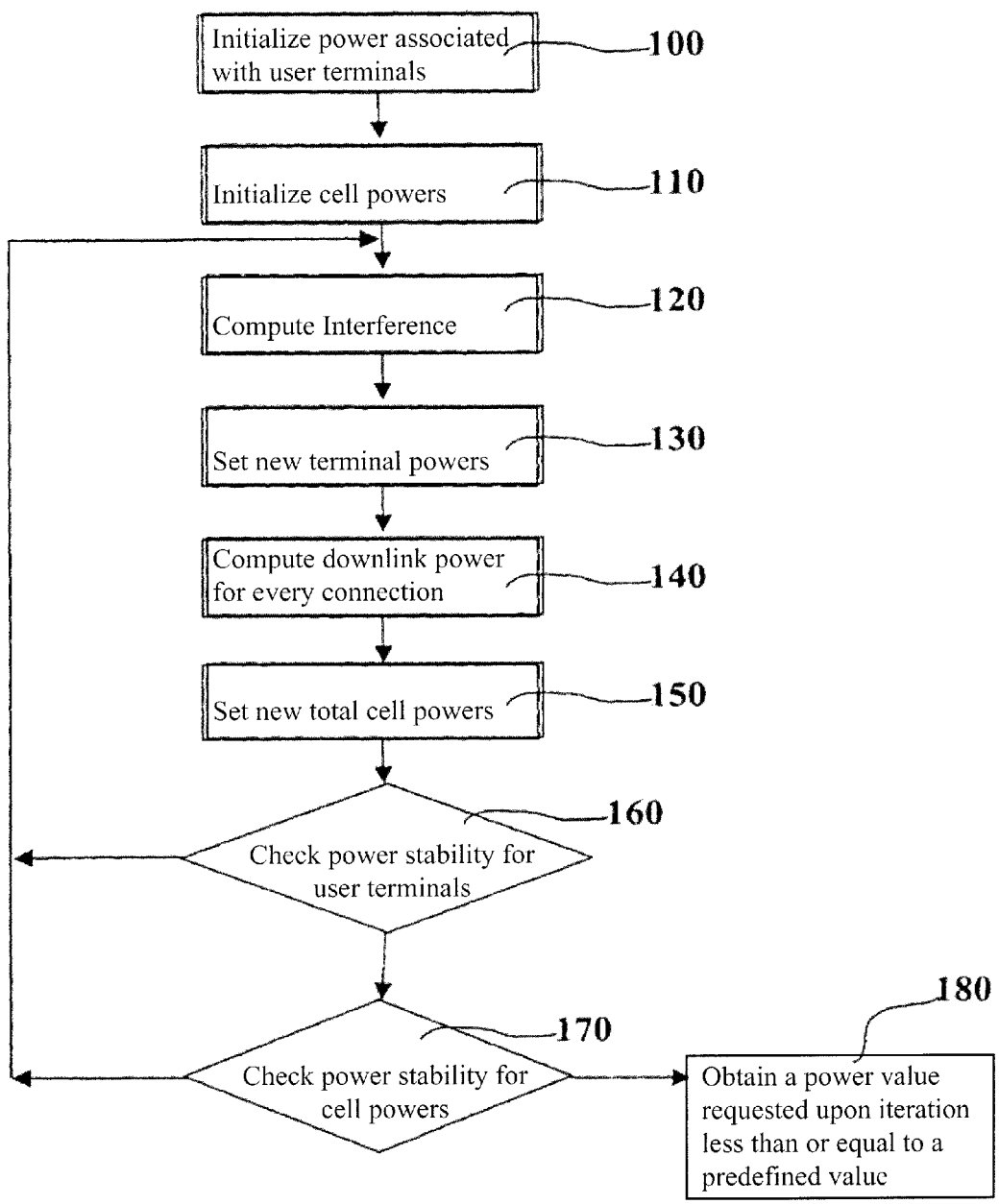
FIG. 2 is a flow diagram related to some processes that can be performed in a system according to the invention.

With reference to FIG. 2, a step 100 performs the initialisation of powers associated with user terminals (User Equipment or UE).

All output powers from terminals are initialised to zero, for every pixel (m, n) belonging to the input computation domain and for every service.

$$P_{m,n,s}^{UE} = 0$$

The set $\Phi_j$ is further initialised for every cell, setting it equal to set $\Omega_j$.

In a step 110 the initialisation of cell powers is performed.

All total output powers from stations are initialised to a minimum value. Such minimum value corresponds to the power dedicated to common channels, divided into the terms related to channel SCH and to remaining channels. The SCH channel is separated from the other ones in order to allow pointing out, from a computational point of view, its independence, during the spreading phase, from the tree of spreading codes on the downlink used for the other channels (both control and traffic channels).

The terms $P_j^{ComCH}$ and $P_j^{SCH}$ can be expressed, for example, as a fraction of the power class of the radio station amplifier or as a fraction of the delivered power on the radio station CPICH channel.

For every station j:

$$P_{req}(j) = P_j^{ComCH} + P_j^{SCH}$$

In a step 120 the computation of the interference, to which the cells have been subjected, is performed.

The total power, received on the whole CDMA or W-CDMA band, is computed for every radio station in the following way.

For every station j:

$$RTWP(j) = \bar{I}(j) + P_{Noise}$$

with:

$$\bar{I}(j) = \sum_{(m,n)\in\Omega_j} \sum_{s=1}^{N_{serv}^j} \left. \frac{P_{m,n,s}^{UE} \cdot N_{m,n,s} \cdot \chi_s^{UL}}{Loss_{UL}(m,n,j)} \right|_{P_{m,n,s}^{UE} \le P_{MAX}^{UE}}$$

When computing the interference, only those mobile terminals are taken into account that transmit at a power that is lower than, or at most equal to the maximum power that can be delivered by the terminals themselves.

In a step 130, the new terminal powers are set. For every terminal, for every pixel (m, n) belonging to the input computation domain and for every service, the powers required to the terminals to satisfy the service quality requirements (target Signal/Noise Ration or SNR) on the uplink are computed.

$$P_{m,n,s}^{UE} = \text{Min}\left[\frac{SNR_S^{UL}}{1+SNR_S^{UL}}RTWP(j)Loss_{UL}(m,n,j)\right]_{\forall j \in MD(m,n,Thr)}$$

with Thr a design parameter whose value is, for example, approximately 3 dB.

At the end of this computing step, the sets $\Phi_j$ are updated so that the generic pixel (m, n) belonging to $\Omega_j$ univocally belongs to the set $\Phi_j$ if and only if $$P_{m,n,s}^{UE} = \frac{SNR_S^{UL}}{1+SNR_S^{UL}}RTWP(j)Loss_{UL}(m,n,j)$$

In a step 140 the computation of the necessary downlink power for every connection is computed.

For every terminal, for every pixel (m, n) belonging to the input computation domain and for every service, the power required to the serving stations to satisfy the service quality requirements (target signal/noise ratio) on the downlink are computed.

$$P_{m,n,s}^j = SNR_S^{DL} \cdot [(1-\alpha_j) \cdot (P_{req}(j) - P_j^{SCH} - P_{m,n,s}^j) +$$
$$P_j^{SCH} + P_{Noise} \cdot Loss_{DL}(m,n,j) + I_{extra}(m,n,j)]$$

and therefore $$P_{m,n,s}^j = \gamma_s[(1-\alpha_j) \cdot P_{req}(j) +$$
$$\alpha_j \cdot P_j^{SCH} + P_{Noise} \cdot \text{Loss}_{DL}(m, n, j) + +I_{extra}(m, n, j)]$$

with $$I_{extra}(m, n, j) = \sum_{\substack{K=1 \\ K \neq j}}^{N_{celle}} P_{req}(k) \cdot \frac{\text{Loss}_{DL}(m, n, j)}{\text{Loss}_{DL}(m, n, k)}$$

$$\gamma_S = \frac{SNR_S^{DL}}{1 + SNR_S^{DL}(1-\alpha_j)}$$

In a step 150, the setting of new total cell powers is performed.

The total powers are computed that are delivered by the radio stations by cumulating the powers used for transmitting common channels and traffic channels. The pixel requesting a power that falls outside the range [Pmin,Pmax] is put out of operation (Outage), namely it is deemed as not belonging to the service area.

For every radio station j:

$$P_{req}(j) =$$
$$P_j^{ComCH} + P_j^{SCH} + \sum_{(m,n) \in \Phi_j} \sum_{s=1}^{N_{serv}^j} \overline{x}_S^{DL} \cdot N_{m,n,s} \cdot P_{m,n,s}^{DL} \bigg|_{P_{m,n,s}^{DL} \in [P_{min}, P_{max}]}$$

Depending on the obtained value, the following is set:

$$P_{req}(j) = \begin{cases} P_{req}(j) & se\ P_{req}(j) \leq P_{TOT}^j \\ P_{TOT}^j & se\ P_{req}(j) > P_{TOT}^j \end{cases}$$

In a step 160, the power stability check is performed for user terminals UE.

The computation is iterated with new powers computed in step 130 till, for every UE, for every pixel (m, n) and for every service s, such a power value is obtained, requested upon iteration n ($P_{m,n,s}^{UE}(n)$) that:

$$|P_{m,n,s}^{UE}(n) - P_{m,n,s}^{UE}(n-1)| \leq Toll\_PW\_UE$$

with Toll_PW_UE equal to a predefined value (currently called Power Control step in uplink).

In a step 170 the stability check is performed for cell powers.

The computation is iterated with new powers computed in step 150 till in step 180 a value of power requested upon iteration n ($P_{req}^n(j)$) is obtained such that:

$$|P_{req}^n(j) - P_{req}^{n-1}(j)| \leq Toll\_PW$$

with Toll_PW equal to a predefined value (currently called Power Control step in downlink).

The thereby-obtained joint uplink/downlink service area will not need any re-examination of planning steps in reply to negative responses of the capacity check avoiding recycles on the planning process steps. Such area will be composed of the set of pixels in which the service is guaranteed by complying with the service quality requirements on both links (uplink and downlink) and the correct use of radio station power resources in compliance with the limits on maximum power that can be delivered by the radio station both globally ($P_{TOT}$) towards all served terminals (compliance with the limits on maximum power that can be delivered by the radio station), and for every individual connection (compliance with the limits on power that can be delivered for every individual connection [Pmin,Pmax]).

It can be appreciated that, leaving the principle of the invention unchanged, the realisation parts and the embodiments can change, even greatly, with respect to what has been described and shown, merely as a non-limiting example, without departing from the scope of the invention, as defined by the following claims.

The invention claimed is:

1. A process for planning a communications network adapted to serve a set of user terminals to which communication services are provided by means of a set of service areas identified through cells with respective associated cell serving stations, each serving station having certain output transmission power and service capacity, wherein the cells are divided into pixels and wherein said user terminals are adapted to communicate within said cells on respective uplinks and downlinks, said communication services having associated respective service quality levels on said uplinks and downlinks, each one of said serving stations having respective power limits related to the maximum power that can be delivered by each serving station globally toward all served user terminals and the power that can be delivered by each serving station via an individual connection toward an individual user terminal, comprising the steps of:
   determining, using a processing subsystem, each one of the service areas of said set as joint uplink/downlink service areas composed of the set of pixels in which respective communication service is guaranteed by complying with associated quality requirements on both uplinks and downlinks;
   verifying, using the processing subsystem, compliance of said power limits on the maximum power that can be delivered by each respective serving station simultaneously toward all served user terminals and compliance of a previously defined range of minimum and maximum power limits that can be delivered by each respective serving station via each individual connection toward an individual user terminal;
   initialising the power associated with user terminals of said set by initialising to zero all output power of the terminals for every pixel belonging to a respective access control area and for every service;
   initialising, for every cell, a first set of pixels belonging to the service area of the cell by setting said set equal to a second set of the pixels belonging to said respective access control area of the cell;
   initialising the cell power, setting said respective output transmission power to a minimum value corresponding to the power dedicated to common channels;
   determining, for every cell, the interference to which the cells had been subjected;
   establishing new power values associated with the user terminals of said set, determining for every terminal and for every pixel belonging to said respective access control area and for every service, the power required to the terminals for satisfying the service quality requirements on the uplink, updating said first set by assigning to said first set the pixels of said second set for which said service quality requirements on the uplink are satisfied;
   computing the necessary power for every connection on said downlink, determining for every pixel belonging to said respective access control area and for every service, the power required to the serving station of said cell to satisfy the service quality requirements on the downlink;

establishing new total cell powers, cumulating the service powers used by the respective serving station to serve the communication channels toward said user terminals; and setting out of service the pixels that require such a service power to be outside a given range of minimum power and maximum power.

2. The process according to claim 1, wherein the step of determining said joint uplink/downlink service area comprises:

a first sub-step of controlling the admission wherein a set of admission control pixels are determined that are subjected to be served by the determined service capacity of the respective serving station, and a second sub-step of controlling the power which also comprises checking whether said admission control pixels belong to said joint uplink/downlink service area.

3. The process according to claim 2, wherein said first sub-step defines, depending on the distribution of expected traffic and the domain of pixels in which the signal from said serving station can be decoded by a terminal when there is only thermal noise, at least one sub-area of said domain comprising admission control pixels in which a control channel of said serving station has a signal level that is greater than all control signals related to all other serving stations belonging to the area under planning.

4. The process according to claim 3, comprising, in case of a universal mobile telecommunications network, the step of choosing, as said sub-area, the best server common pilot-channel area of said universal mobile telecommunications network related to the stations belonging to the service area under planning.

5. The process according to claim 2, wherein said second sub-step comprises:

checking in a first check step on the uplink, depending on the admission control pixels, whether the power level of terminal necessary for communicating with said serving station is lower than or equal to the maximum power level that can be delivered by the terminal; and checking in a second checking step on the downlink, depending on said first checking step, whether the power level of said serving station falls within the maximum power that can be delivered by the serving station globally toward all served terminals and by individual connection toward an individual terminal.

6. The process according to claim 2, comprising performing the first sub-step of controlling the admission by determining a cell loading factor as ratio between the cell load that is provided to be accepted and the maximum load defined as load next to which the system is under unstable conditions.

7. The process according to claim 2, wherein said second sub-step of jointly checking the power on the uplinks and downlinks comprises a check on the uplink for computing the necessary power for every terminal being present in one of said admission control pixels for communicating with the serving station and then verifying that such power is lower than or at most equal to the maximum power that can be delivered by the terminal, and i) if said check on the uplink provides a positive result, inserting the related pixel in the set of served pixels on the uplink, and ii) if said check on the uplink provides a negative result, inserting the related pixel in the set of pixels that are not operating.

8. The process according to claim 7, wherein said second sub-step of jointly checking the power on the uplinks and downlinks comprises a further check, performed on said set of served pixels on the uplink, comprising computing the necessary power for the station serving each pixel of said served set on the uplink for managing the expected traffic in the pixel and in verifying that such power is within a given range and wherein total power of every serving station is lower than or at most equal to maximum power that can be delivered by the serving station.

9. The process according to claim 1, comprising, after the step of establishing new power values associated with the user terminals of said set, the step of performing, for every serving station, a power stability test for user terminals by iterating the computation with increasing power values associated with user terminals of said set until, for every user terminal, for every pixel and for every service, a power value is obtained corresponding to an increase with respect to the previous iteration lower than a predefined threshold value in uplink.

10. The process according to claim 1, comprising, after the step of establishing new total cell powers, the step of performing, for every serving station, a power stability test of a cell by iterating the computation with increasing values of total cell power until for every cell, a power value is obtained that corresponds to an increase with respect to the previous iteration lower than a predefined threshold value in downlink.

11. The process according to claim 1, wherein said step of initialising the cell powers is realised by setting said respective output transmission powers to a minimum value corresponding to the power dedicated to common channels divided into terms related to a signaling channel and the remaining cell channels.

12. The process according to claim 1, wherein said step of initialising the cell powers is realised by expressing said powers with a value between the fraction of the amplifier power class of the related serving station and a fraction of the power delivered on a common pilot channel by said related serving station.

13. The process according to claim 1, wherein said step of determining, for every cell, the interference to which the cells had been subjected is realised by establishing, for each serving station, total power on a whole respective working band.

14. The process according to claim 1, wherein said step of determining, for every cell, the interference to which the cells had been subjected comprising the steps of:

establishing, for the power that can be delivered by said user terminals of said set, a maximum allowable value; and taking into account, in regard to said interference, only the user terminals of said set that transmit at a power that is lower than, or at most equal to said maximum allowable value.

15. A process for implementing a communications network, comprising a step of materially implementing, using a processing subsystem, the communications network planned with the process according to claim 1.

16. A non-transitory computer readable medium encoded with a computer program product loadable into a memory of at least one processor and comprising portions of software code for performing the process according to claim 1.

* * * * *